United States Patent
Noguchi et al.

(10) Patent No.: US 7,704,442 B2
(45) Date of Patent: Apr. 27, 2010

(54) PROCESS FOR PRODUCING HONEYCOMB STRUCTURE

(75) Inventors: Yasushi Noguchi, Nagoya (JP); Takehiko Watanabe, Toki (JP); Yukari Nakane, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/209,866

(22) Filed: Sep. 12, 2008

(65) Prior Publication Data

US 2009/0011919 A1 Jan. 8, 2009

Related U.S. Application Data

(63) Continuation of application No. PCT/JP2007/055458, filed on Mar. 16, 2007.

(30) Foreign Application Priority Data

Mar. 17, 2006 (JP) .............................. 2006-074677

(51) Int. Cl.
*B28B 1/00* (2006.01)
*B28B 3/00* (2006.01)
*C04B 33/32* (2006.01)
*C04B 33/36* (2006.01)
*C04B 35/03* (2006.01)
*C04B 35/00* (2006.01)
*B32B 3/12* (2006.01)

(52) U.S. Cl. .................... 264/630; 264/629; 501/119; 501/128; 428/116

(58) Field of Classification Search ................ 264/628, 264/630, 631; 501/80, 119, 128; 428/116; 55/523
See application file for complete search history.

(56) References Cited

U.S. PATENT DOCUMENTS

| 4,973,566 | A | * | 11/1990 | Readey et al. ................ 501/129 |
| 6,695,967 | B2 | * | 2/2004 | Bishop et al. ............ 210/510.1 |
| 7,294,164 | B2 | * | 11/2007 | Merkel ........................ 55/523 |
| 7,485,170 | B2 | * | 2/2009 | Beall et al. .................... 55/523 |
| 2002/0004445 | A1 | * | 1/2002 | Beall et al. ................... 501/119 |
| 2003/0041574 | A1 | | 3/2003 | Noguchi et al. |
| 2004/0053005 | A1 | | 3/2004 | Hamanaka et al. |

(Continued)

FOREIGN PATENT DOCUMENTS

JP    A 2001-79321    3/2001

(Continued)

*Primary Examiner*—Karl E Group
*Assistant Examiner*—Noah S Wiese
(74) *Attorney, Agent, or Firm*—Oliff & Berridge, PLC

(57) ABSTRACT

A process for producing a honeycomb structure by obtaining clay from a cordierite-forming raw material containing an alumina source, a silica source, and a magnesia source; and forming the clay into a honeycomb shape, wherein a material having, in its volume particle size distribution, a 50 volume % particle size (V50) [μm] of 1 to 25 μm is used, as each of alumina source, silica source, and magnesia source; and a material having, in the volume particle size distribution of the whole cordierite-forming raw material, a ratio of 90 volume % particle size ($V_{all}90$) [μm] to 10 volume % particle size ($V_{all}10$) [μm] [a volume particle size distribution ratio ($V_{all}90/V_{all}10$)] of 10 or less and a difference ($V_{all}90-V_{all}10$) between 90 volume % particle size ($V_{all}90$) [μm] and 10 volume % particle size ($V_{all}10$) [μm] of 25 μm or less is used, as the cordierite-forming raw material.

5 Claims, 2 Drawing Sheets

U.S. PATENT DOCUMENTS

2004/0112024 A1  6/2004  Noguchi et al.
2007/0225149 A1* 9/2007  Hayashi et al. ............... 501/80

FOREIGN PATENT DOCUMENTS

| JP | A 2001-205082 | 7/2001 |
| JP | A 2001-340718 | 12/2001 |
| JP | WO 01/91882 A1 | 12/2001 |
| JP | A 2002-159811 | 6/2002 |
| JP | A 2002-219319 | 8/2002 |
| JP | A 2002-301323 | 10/2002 |
| JP | A 2003-534229 | 11/2003 |

* cited by examiner

US 7,704,442 B2

PROCESS FOR PRODUCING HONEYCOMB STRUCTURE

TECHNICAL FIELD

The present invention relates to a process for producing a honeycomb structure. More particularly, the present invention relates to a process for producing a honeycomb structure of high porosity which is useful as a filter for exhaust gas, particularly a diesel particulate filter (DPF) for trapping the particulate matter, etc., present in the exhaust gas of diesel engine.

A requirement for removal of particulate matter and harmful substances present in the exhaust gases of internal combustion engine, boiler, etc., is growing in view of their influence on environment. The regulation with respect to, in particular, the removal of the particulate matter (hereinafter may be referred to as "PM") discharged from diesel engine is being intensified worldwide; and it is drawing attention to use, as a filter for removing the PM (a diesel particulate filter, this may hereinafter be referred to as "DPF"), a filter made of a honeycomb structure (a honeycomb filter), and various systems have been proposed.

The DPF ordinarily has a structure in which a plurality of cells functioning as fluid passages are separated and formed by porous partition walls and the cells are plugged alternately so that each porous partition wall forming the cells may function as a filter.

As the material for DPF, there is preferably used cordierite which is small in thermal expansion coefficient and high in thermal shock resistance.

Such a cordierite-based honeycomb structure is produced, for example, by mixing and kneading a cordierite-forming raw material, water, a binder, a pore former, etc., to prepare clay, and subjecting the clay to extrusion forming into a honeycomb shape (see, for example, Patent Documents 1 and 2).

A honeycomb filter using such a honeycomb structure is required to have a high porosity in order to reduce pressure loss so that, when it has been fitted into the exhaust gas system of diesel engine or the like and used, a sufficient engine performance can be obtained. Hence, in producing the honeycomb structure, it is being conducted to increase the amount of pore former in clay to be formed in order to raise the porosity of honeycomb structure obtained. In addition, it is required to form pores in a small range at a high rate, that is, to sharpen the pore diameter distribution in order to increase trapping efficiency and inhibit pressure loss due to clogging in pores from increasing.

Patent Document 1: JP-A-2002-219319
Patent Document 2: JP-A-2002-301323

DISCLOSURE OF THE INVENTION

Meanwhile, in recent years, a rise in demand for DPF has necessitated the continuous production of honeycomb structure by use of a continuous forming machine or the like. However, such continuous production by a continuous forming machine brings about higher kneading of clay. This induces easy collapse of the pore former contained in the clay and makes difficult the production of a honeycomb structure of high porosity, or, in view of the collapse of the pore former, it is necessary to use a large amount of a pore former, which is relatively expensive, in the clay to be formed. These have been problems. In addition, due to variance in particle size distribution of the pore former and collapse generation upon production, it has been difficult to stably mass-produce a honeycomb structure having a sharp pore diameter distribution.

The present invention has been made in view of the above-mentioned problems of the prior art and aims at providing a process for producing a honeycomb structure having a high porosity and a sharp pore diameter distribution which is useful as a filter for exhaust gas, particularly a diesel particulate filter (DPF) for trapping the particulate matter, etc., present in the exhaust gas of diesel engine.

The present inventors made a keen study in order to achieve the above aim. As a result, it was found that a honeycomb structure having a high porosity and a sharp pore diameter distribution can be produced by using, as each of an alumina source, a silica source and a magnesia source (all of which constitute a cordierite-forming raw material used for preparation of clay to be formed into a honeycomb structure), a material having, in its volume particle size distribution, a 50 volume % particle size (V50) [μm] of 1 to 25 μm and, as the cordierite-forming raw material, a material having, in its volume particle size distribution of the whole cordierite-forming raw material, a ratio of 90 volume % particle size ($V_{all}$90) [μm] to 10 volume % particle size ($V_{all}$10) [μm] [a volume particle size distribution ratio ($V_{all}$90/$V_{all}$10)] of 10 or less and a difference ($V_{all}$90–$V_{all}$10) between 90 volume % particle size ($V_{all}$90) and 10 volume % particle size ($V_{all}$10) of 25 μm or less. The finding has led to the completion of the present invention.

That is, according to the present invention, the is provided a process for producing a honeycomb structure shown below.

[1] A method for producing a honeycomb structure produced via a step of forming clay obtained from a cordierite-forming raw material which contains an alumina source, a silica source, and a magnesia source into a honeycomb shape, wherein there is used, as each of the alumina source, the silica source, and the magnesia source, a material having, in its volume particle size distribution, a 50 volume % particle size (V50) [μm] of 1 to 25 μm, and there is used, as the cordierite-forming raw material, a material having, in its volume particle size distribution of the whole cordierite-forming raw material, a ratio of 90 volume % particle size ($V_{all}$90) [μm] to 10 volume % particle size ($V_{all}$10) [μm] [a volume particle size distribution ratio ($V_{all}$90/$V_{all}$ ))] of 10 or less and a difference ($V_{all}$90–$V_{all}$10) between 90 volume % particle size ($V_{all}$90) [μm] and 10 volume % particle size ($V_{all}$10) [μm] of 25 μm or less.

[2] A process for producing a honeycomb structure according to the above [1] wherein there is used, as each of the alumina source, the silica source and the magnesia source, a material having, in its volume particle size distribution, a 50 volume % particle size (V50) [μm] of 5 to 20 μm.

[3] A process for producing a honeycomb structure according to the above [2], wherein there is used, as each of the alumina source, the silica source and the magnesia source, a material having, in its volume particle size distribution, a 50 volume % particle size (V50) [μm] of 10 to 20 μm.

[4] A process for producing a honeycomb structure according to any of the above [1] to [3], wherein the clay is prepared using no pore former and formed to produce a honeycomb structure.

[5] A process for producing a honeycomb structure according to the above [4], which has a porosity of 40% or more.

According to the present invention there can be provided a process for producing a honeycomb structure having a high porosity and a sharp pore diameter distribution which is useful as a filter for exhaust gas, particularly a diesel particulate filter (DPF) for trapping the particulate, etc., present in the exhaust gas of diesel engine.

It is noteworthy that, in a process for producing a honeycomb structure of the present invention, as the clay used for forming of the honeycomb structure of the present invention, there is used a cordierite-forming raw material which has a controlled particle size distribution with each of the components constituting the cordierite-forming raw material having as well a controlled particle size distribution, whereby the closest packing of the cordierite-forming raw material can be avoided, and pores are formed in the honeycomb structure based on the packed condition of each component. As a result, a honeycomb structure of high porosity can be obtained, for example, even by using no pore former in the clay. In addition, since no pore former is used, sharpening of a pore diameter distribution of the honeycomb structure can be realized with maintaining high porosity.

BRIEF DESCRIPTION OF THE DRAWINGS

FIG. 1 is a perspective view schematically showing an embodiment of the honeycomb structure of the present invention.

FIG. 2 is a graph showing the relations between pore diameter [µm] and pore volume [cc], of the honeycomb structures of Examples 5 and 7 and Comparative Examples 1 and 4. The axis of abscissas indicates pore diameter [µm] and the axis of ordinates indicates log differential pore volume [cc/g].

DESCRIPTION OF REFERENCE NUMERALS

Figure 1:
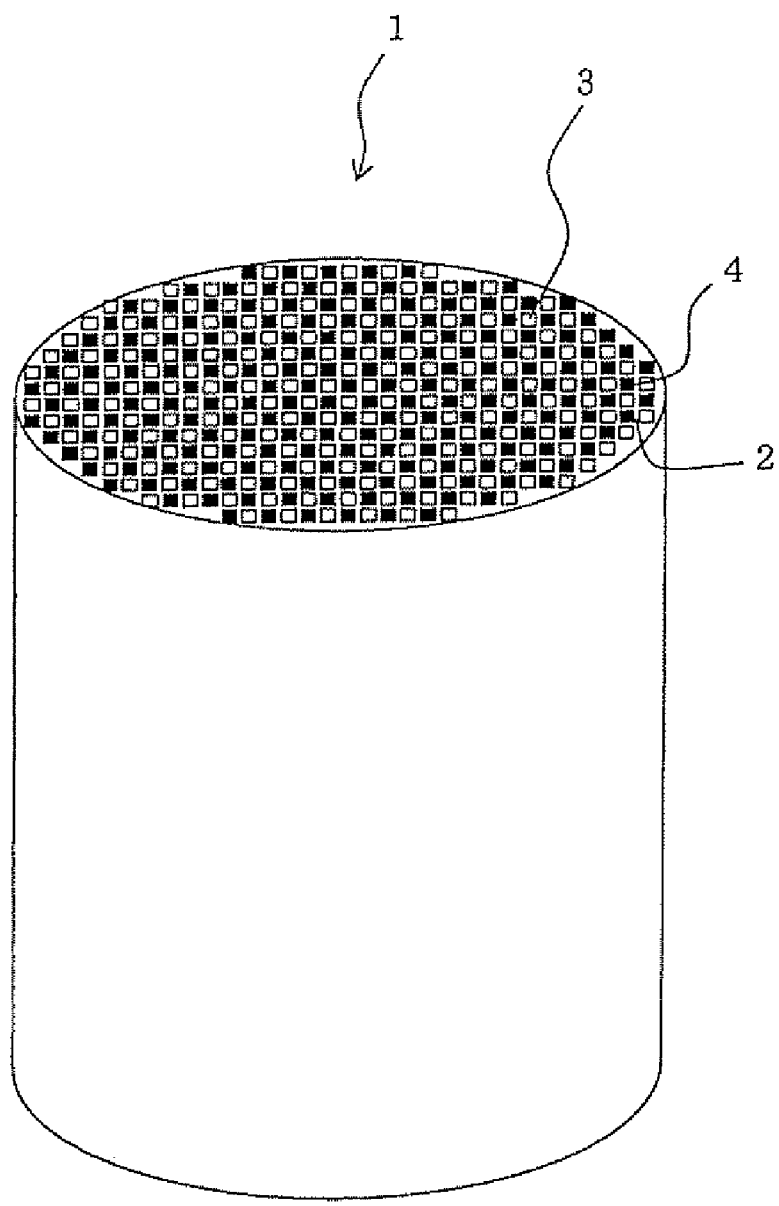
[FIG. 1]

1: honeycomb structure; 2: partition wall; 3: cell; 4: plugging portion

DESCRIPTION OF THE PREFERRED EMBODIMENTS

Embodiments of a process for producing a honeycomb structure of the present invention are described in detail below with reference to the accompanying drawings. However, the present invention is not restricted thereto, and it should be construed that various changes, modifications and improvements can be made to the present invention based on the knowledge of those skilled in the art as long as there is no deviation from the gist of the present invention.

[1] Process for Producing a Honeycomb Structure:

Hereinbelow, description is made on an embodiment of a process for producing a honeycomb structure of the present invention. A process for producing a honeycomb structure of the present invention is a process for producing a honeycomb structure by obtaining clay from a cordierite-forming material containing an alumina source, a silica source, and a magnesia source and forming the clay into a honeycomb shape.

In a process for producing a honeycomb structure of the present embodiment, there is used, as each of the alumina source, the silica source and the magnesia source, a material having, in its volume particle size distribution, a 50 volume % particle size (V50) [µm] of 1 to 25 µm, and there is used, as the cordierite-forming raw material, a material having, in its volume particle size distribution of the whole cordierite-forming raw material, a ratio of 90 volume % particle size ($V_{all}90$) [µm] to 10 volume % particle size ($V_{all}10$) [µm] [a volume particle size distribution ratio ($V_{all}90/V_{all}10$)] of 10 or less and a difference ($V_{all}90-V_{all}10$) between 90 volume % particle size ($V_{all}90$) [µm] and 10 volume % particle size ($V_{all}10$) [µm] of 25 µm or less.

According to a process for producing a honeycomb structure of the present embodiment, the closest packing of the cordierite-forming raw material can be avoided, and pores are formed in the honeycomb structure based on the packed condition each of the raw materials; as a result, the honeycomb structure having a high porosity and a sharp pore diameter distribution can be obtained.

Consequently, according to a process for producing a honeycomb structure of the present embodiment, a high porosity of the honeycomb structure can be realized even by, for example, using no pore former in the clay to be formed. In particular, according to a process for producing a honeycomb structure of the present embodiment, there can be obtained a honeycomb structure having a porosity of 40% or more, preferably 45% or more, and a sharp pore diameter distribution of a pore diameter distribution range (D90-D10) of 20 µm or less owing to the above-mentioned effect of no closest packing, even by using no pore former in the clay to be formed.

The above "pore diameter distribution range" means a value (D90-D10) obtained by deducting a value of D10 from a value of D90 with 10 volume % pore diameter [µm] of a pore volume being defined as D10 and 90 volume % pore diameter [µm] of a pore volume being defined as D90 and serves as an index showing sharpness of a pore diameter distribution in a honeycomb structure.

For these reasons, the honeycomb structure (hereinbelow sometimes referred to as "present honeycomb structure") obtained by a process for producing a honeycomb structure of the present embodiment can effectively be used as a filter for exhaust gas, particularly, a diesel particulate filter (DPF) for trapping particulate matter, etc., in the exhaust gas of diesel engine.

Incidentally, in the present specification, "porosity" refers to a value ($P_o$) obtained from the following formula (1) using the total pore volume (V) of a honeycomb structure measured by mercury porosimetry and the true specific gravity ($d_t$) of constituent material of the honeycomb structure (in the case of cordierite, $d_t$=2.52 g/cm$^3$). In addition, in the present specification, "high porosity" refers to a porosity of 40% or more.

$$P_o = \{(V/(V+1/d_t)\} \times 100 \quad (1)$$

[In the above formula (1), $P_o$ is a porosity; V is a total pore volume; and $d_t$ is a true specific gravity.]

In a process for producing a honeycomb structure of the present embodiment, a honeycomb structure of the present embodiment can be obtained so that each partition wall has, at the surface thereof, openings of uniform-diameter pores. When there is shown, for example, a graph of pore diameter distribution where the axis of abscissas indicates pore diameter (µm) and the axis of ordinates indicates log differential pore volume (cc/g), the honeycomb structure of the present embodiment, as compared with conventional honeycomb structures, show a sharp pore diameter distribution, and, when used as a filter, the honeycomb structure can have a high ability for trapping of particulate matter. In such a honeycomb structure, the pore diameters are small and uniformly distributed, and therefore, the structure itself can have a high strength.

The present honeycomb structure obtained by a process for producing a honeycomb structure of the present embodiment is a honeycomb structure 1 having a plurality of through-holes (cells 3) separated from one another by porous partition walls 2 and functioning as fluid passages as shown in FIG. 1. Incidentally, the honeycomb structure 1 shown in FIG. 1 is further provided with plugging portions 4 disposed so as to alternately plug one of the open end portions of each of the cells 3. However, the honeycomb structure is not particularly limited to the structure. Here, FIG. 1 is a perspective view schematically showing a honeycomb structure obtained by a process for producing a honeycomb structure of the present embodiment.

With respect to the total figure of the present honeycomb structure, a honeycomb structure 1 shown in FIG. 1 can be mentioned as an example. However, the total shape, cell shape, etc., of the honeycomb structure 1 are not restricted to those shown in FIG. 1. As the total shape, there can be mentioned a cylinder shown in FIG. 1, a quadrangular prism, a triangular prism, etc. As the cell shape (the shape of cell 3 in the section perpendicular to the flow direction of fluid), there can be mentioned a square as shown in FIG. 1, a hexagon, a triangle, a circle, etc.

In the honeycomb structure 1 shown in FIG. 1, plugging portions 4 are disposed at opening of cells 3 so that each end of the honeycomb structure looks checkerwise. However, the disposition pattern of plugging portions 4 is not particularly restricted and may also be, for example, linear, concentric or radial and can be selected from various patterns depending upon the state in which cells 3 have been separated and formed.

[2] Cordierite-forming Raw Material

Here, description will be made on a cordierite-forming raw material. The cordierite-forming raw material is used as a raw material for clay to form a honeycomb structure and a powdery raw material which contains an alumina source, a silica source, and a magnesia source. The cordierite-forming raw material can be converted into cordierite by firing.

It is specifically a raw material obtained by mixing an alumina source, a silica source and a magnesia source so that they exhibit, after firing, a cordierite theoretical composition ($2MgO.2Al_2O_3.5SiO_2$).

In a process for producing a honeycomb structure of the present embodiment, there is used, as each of the alumina source, the silica source, and the magnesia source, a material having, in its volume particle size distribution, a 50 volume % particle size (V50) [μm] of 1 to 25 μm.

Incidentally, in the present specification, "volume particle size distribution" refers to a volume particle size distribution obtained by multiplying the particle size distribution of each raw material component measured by laser diffraction/scattering method by the reciprocal of the specific gravity of each raw material component.

In conventional cordierite-forming raw materials, the 50 volume % particle sizes (V50) [μm] of individual raw material components in respective volume particle size distributions were greatly different from one another; therefore, fine particles were present in the gaps to become pores, creating a state of closest packing. Accordingly, use of a pore former of a large amount was necessary in order to obtain a porosity required in filter such as DPF or the like.

In a process for producing a honeycomb structure of the present embodiment, since there is used a cordierite-forming raw material, whose components have each, in its volume particle size distribution, a 50 volume % particle size (V50) (μm) controlled in the above-mentioned range, the closest packing of the raw material can be avoided favorably.

Further, in the honeycomb structure of the present embodiment, there is used, as the cordierite-forming raw material, a material having, in its volume particle size distribution of the whole cordierite-forming raw material, a volume particle size distribution ratio ($V_{all}90/V_{all}10$) of 10 or less and a volume particle size distribution range ($V_{all}90-V_{all}10$) of 25 μm or less. Therefore, the particle size of the cordierite-forming raw material as a whole is in a narrow range, the effect in avoiding the closest packing is further enhanced, and a honeycomb structure having a high porosity and a sharp pore diameter distribution can be obtained.

Incidentally, the volume particle size distribution of the whole cordierite-forming raw material can be calculated, as shown in the following formula (2) as a total sum of products of the volume particle size distribution of each component and its compounding ratio.

Volume particle size distribution of the whole cordierite-forming raw material=Σ(volume particle size distribution of each component x its compounding ratio)  (2)

The volume particle size distribution of the whole cordierite-forming raw material, i.e., $V_{all}90/V_{all}10$ is preferred to be as small as possible. However, its lowest value is substantially about 2 to 3. The lowest value changes also depending upon the kinds of the alumina source, silica source and magnesia source which constitute the cordierite-forming raw material.

In a process for producing a honeycomb structure of the present embodiment, there is used, as each of the alumina source, the silica source and the magnesia source, a material having, in its volume particle size distribution, a 50 volume % particle size (V50) [μm] of preferably 5 to 20 μm, more preferably 10 to 20 μm. By using such raw materials, by the filling of the cordierite-forming raw material, gaps are favorably formed between component particles, and a honeycomb structure of higher porosity can be obtained. As a result, in a process for producing a honeycomb structure of the present embodiment, a honeycomb structure having a porous structure can be obtained without using any pore former in the clay. Such a honeycomb structure does not have pores derived from a pore former and, therefore, requires no pore former, which is relatively expensive, and accordingly can be obtained at low costs.

In the past, when clay containing a pore former was formed using a continuous forming machine or the like, the amount of pore former collapsed were different in each continuous forming, which resulted in different porosities even when clay of the same composition was used. However, since a honeycomb structure having a porous structure can be obtained without using any pore former as mentioned above, there is no difference in porosity among production lots and a honeycomb structure having a porosity of stable level can be obtained on a steady basis.

[2-1] Alumina Source

The alumina source constituting the cordierite-forming raw material may be particles of, for example, alumina, an alumina-containing compound oxide, or a substance converted into alumina when fired. Use of particles of alumina or aluminum hydroxide [$Al(OH)_3$] is preferred because they are available as commercial products of low impurity content.

Also, particles of, for example, kaolin ($Al_2O_3.2SiO_2.2H_2O$) or mullite ($3Al_2O_3.2SiO_2$) can be used as an alumina source because they can function as an alumina source and a silica source.

[2-2] Silica Source

As the silica source constituting the cordierite-forming raw material, there can be used particles of, for example, silica, a silica-containing compound oxide, or a substance converted into silica when fired. Specifically, there can be mentioned particles of, for example, silica ($SiO_2$) including quartz, kaolin ($Al_2O_3.2SiO_2.2H_2O$), talc ($3MgO.4SiO_2.H_2O$) or mullite ($3Al_2O_3.2SiO_2$). The particles as silica source (silica source particles) may contain, as impurities, sodium oxide ($Na_2O$), potassium oxide ($K_2O$), etc. However, the ratio of the total mass of impurities to the total mass of silica source particles is preferably 0.01 mass % or less in order to prevent the rise in thermal expansion coefficient and achieve an increase in heat resistance.

The kaolin particles may contain mica, quartz, etc., as impurities. However, the ratio of the total mass of impurities to the total mass of kaolin particles is preferably 2 mass % or less in order to prevent the rise in thermal expansion coefficient and achieve an increase in heat resistance.

[2-3] Magnesia Source

The magnesia source constituting the cordierite-forming raw material may be particles of, for example, magnesia, a magnesia-containing compound oxide, or a substance converted into magnesia when fired. Specifically, there can be mentioned particles of talc, magnesite ($MgCO_3$), etc. Of these, talc particles are preferred. The particles as magnesia source (magnesia source particles) may contain, as impurities, iron oxide ($Fe_2O_3$), calcium oxide (CaO), sodium oxide ($Na_2O$), potassium oxide ($K_2O$), etc.

However, the ratio of the mass of iron oxide to the total mass of magnesia source particles is preferably 0.1 to 2.5 mass %, and the ratio of the total mass of calcium oxide, sodium oxide and potassium oxide to the total mass of magnesia source particles is preferably 0.35 mass % or less in order to prevent the rise in thermal expansion coefficient and achieve an increase in heat resistance.

[3] Steps of Producing Honeycomb Structure:

Hereinbelow, a process for producing a honeycomb structure of the present invention will be described more specifically by each step.

[3-1] Preparation of Clay

In a process for producing a honeycomb structure of the present embodiment, first, there are prepared each of the raw materials for each raw material (alumina source, silica source, and magnesia source), and they are blended so that their composition after firing may become a theoretical composition of cordierite ($2MgO.2Al_2O_3.5SiO_2$). At this time, the alumina source, silica source, and magnesia source each having a 50 volume % particle size (V50) [μm] of 1 to 25 μm are used.

In addition, in a process for producing a honeycomb structure of the present embodiment, the aforementioned alumina source, silica source, and magnesia source are selected and blended together in such a manner that, in a cordierite-forming raw material where the raw materials are blended, the material has, in its volume particle size distribution of the whole cordierite-forming raw material, a volume particle size distribution ratio ($V_{all}90/V_{all}10$) of 10 or less and a volume particle size distribution range ($V_{all}90-V_{all}10$) of 25 μm or less.

Incidentally, as the cordierite-forming raw material used for preparing the clay, there can preferably be used the aforementioned cordierite-forming raw material (an alumina source, a silica source, and a magnesia source).

Incidentally, in a process for producing a honeycomb structure of the present embodiment, there can be used the cordierite-forming raw material containing the alumina source, silica source and magnesia source each having, in its volume particle size distribution, a 50 volume % particle size (V50) [μm] of preferably 5 to 20 μm, more preferably 10 to 20 μm.

Next, to the thus-obtained cordierite-forming raw material is added a dispersion medium such as water or the like, followed by mixing and kneading them to obtain clay for forming.

The mixing can be conducted by using a conventional known mixer, for example, a screw type mixer, a kneader type mixer or a ploughshare (agitating blade) mixer. The kneading can be conducted by using a conventional known kneader, for example, a sigma kneader, a Banbury mixer, or a screw type extrusion kneader. Use of, in particular, a kneader provided with a vacuum device (e.g. vacuum pump), such as a vacuum pug mill or a biaxial continuous kneader and extruder is preferred because there can be obtained clay having less defects and good in formability.

As the dispersing medium added to the cordierite-forming raw material, there can be mentioned, for example, water and a mixed solvent of water and organic solvent such as alcohol. In particular, water can be used preferably. In a method for producing a honeycomb structure of the present embodiment, there may be further added, in mixing and kneading the cordierite-forming raw material and the dispersing medium, additives such as an organic binder, a dispersing agent, and the like.

In a process for production of honeycomb structure according to the present embodiment, since the 50 volume % particle size (V50) [μm] of each of the components of the cordierite-forming raw material, the volume particle size distribution ratio ($V_{all}90/V_{all}10$) of the whole cordierite-forming raw material, and the volume particle size distribution range ($V_{all}90-V_{all}10$) are adjusted, a honeycomb structure having a high porosity and a sharp pore diameter distribution can be obtained even by using no pore former. Consequently, when, for example, continuous forming is conducted, no consideration is required for the collapse of pore former such as a foaming resin and continuous forming can be carried out well. Incidentally, in the process for production of honeycomb structure according to the present embodiment, it is possible, for example, to further add a pore former to the cordierite-forming raw material to produce a honeycomb structure of higher porosity. When a pore former is used, it may be a conventional known pore former other than the above-mentioned foaming resin.

As the organic binder as an additive, there can preferably be used, for example, hydroxypropyl methyl cellulose, methyl cellulose, hydroxyethyl cellulose, carboxymethyl cellulose, or polyvinyl alcohol. As the dispersing agent, there can preferably be used a substance having a surface activity, such as ethylene glycol, dextrin, fatty acid soap or polyalcohol.

[3-2] Forming Step

Next, the clay is formed into a honeycomb shape to obtain a honeycomb formed body wherein a plurality of cells are separated and formed by partition walls. The method for forming is not restricted particularly, and there can be used extrusion forming, injection forming, press forming or the like. Use of extrusion forming is preferred because it makes continuous forming easy and can orient cordierite crystals. The extrusion forming can be conducted by using an apparatus such as vacuum pug mill, ram injection forming machine, a biaxial continuous extrusion forming machine, or the like.

When there is produced a honeycomb structure filter such as a DPF in a process for production of honeycomb structure according to the present embodiment, a honeycomb formed body is produced, and then, a part of the cells are masked at one end of the honeycomb formed body, the end is immersed in a plugging slurry containing the cordierite-forming raw material, etc., in a vessel, to fill the unmasked openings (of the cells to be plugged) with the plugging slurry and form plugging portions. Thereafter, at the other end of the honeycomb formed body, the openings of the cells other than the above plugged cells are filled with the same plugging slurry by the same method to form plugging portions. Incidentally, the method for formation of plugging portions is not restricted to the above method, and plugging portions may be formed by a method employed in conventionally known processes for producing a honeycomb structure.

[3-3] Drying Step

Next, the honeycomb formed body is dried to obtain a honeycomb dried body. The method for drying is not restricted particularly, either, and there can be used a conventionally known drying method such as hot-air drying, microwave drying, dielectric drying, vacuum drying, and freeze-drying. A drying method, which is a combination of hot-air drying and microwave drying or dielectric drying, is preferred because the whole honeycomb formed body can be dried rapidly and uniformly.

Incidentally, the formation of plugging portions at cell openings may be conducted after the drying step.

[3-4] Firing Step

Next, the honeycomb dried body is fired to produce a cordierite-based honeycomb structure. This firing means an operation for sintering the particles of the components (alumina source, silica source and magnesia source) to densify the raw material particles to secure a predetermined strength. The firing conditions (temperature and time) differ depending upon the kinds of the raw material particles constituting the honeycomb formed body and, therefore, may appropriately be selected depending upon the kinds. The firing is preferably conducted, for example, at a temperature of 1,410 to 1,440° C. for 3 to 10 hours. Firing conditions (temperature and time) below the above-mentioned ranges are not preferred because the cordierite-forming raw material may not be crystallized sufficiently, and firing conditions (temperature and time) above the above-mentioned ranges are not preferred because the cordierite formed may melt.

Incidentally, it is preferred to conduct, before the firing or in the temperature elevation stage for firing, an operation (calcination) of burning and removing the organic matter (e.g. organic binder and dispersing agent) present in the honeycomb dried body because the operation can promote the removal of organic matter. Since the burning temperature of an organic binder is about 200° C., and the burning temperature of a pore former is about 300 to 1,000° C., the temperature of calcination may be about 200 to 1,000° C. The time of calcination is not particularly restricted. However, it is ordinarily about 10 to 100 hours.

As above, a cordierite-based honeycomb structure of high porosity can be produced easily. It is noteworthy that, in a process for producing a honeycomb structure of the present embodiment, a high porosity can be realized even by using no combustible pore former such as a fly ash balloon, a foaming resin, graphite, and coke.

EXAMPLES

Hereinbelow, the present invention will be described specifically on the basis of Examples. However, the present invention is in no way restricted to these Examples.

Example 1

There was produced a cordierite-based honeycomb structure (a honeycomb filter) having plugging portions each formed alternately at one opening of each cell so that they look checkerwise at each end of the honeycomb structure. As a specific production process, as shown in Table 1, 44 volume parts of talc A, 22 volume parts of kaolin A, 19 volume parts of alumina A, and 15 volume parts of silica A were mixed to prepare a cordierite-forming raw material. In Table 1 is shown the compounding ratio of the cordierite-forming raw material prepared. In Table 2 are shown the 10 volume % particle size (V10) [μm], 50 volume % particle size (V50) [μm] and 90 volume % particle size (V90) [μm] in the volume particle size distribution and the volume particle size distribution ratio (V90/V10) of each of the raw materials used in Examples.

TABLE 1

| Name of | | Examples | | | | | | | | | Comparative Examples | | | | | | |
|---|---|---|---|---|---|---|---|---|---|---|---|---|---|---|---|---|---|
| | Component | 1 | 2 | 3 | 4 | 5 | 6 | 7 | 8 | 9 | 1 | 2 | 3 | 4 | 5 | 6 | 7 |
| Cordierite-forming raw material | Talc A | 44 | 44 | 47 | — | — | 44 | 47 | 44 | 48 | — | — | — | 10 | 21 | 27 | 23 |
| | Talc B | — | — | — | 44 | — | — | — | — | — | — | — | — | — | — | — | — |
| | Talc C | — | — | — | — | 44 | — | — | — | — | — | — | — | — | — | — | — |
| | Talc D | — | — | — | — | — | — | — | — | — | 15 | 16 | 21 | — | — | — | — |
| | Talc E | — | — | — | — | — | — | — | — | — | — | — | — | 11 | 10 | — | — |
| | Talc F | — | — | — | — | — | — | — | — | — | — | — | — | 21 | — | — | — |
| | Talc G | — | — | — | — | — | — | — | — | — | — | — | — | — | 10 | — | — |
| | Talc H | — | — | — | — | — | — | — | — | — | — | — | — | — | — | 12 | 16 |
| | Kaolin A | 22 | 22 | — | 22 | 22 | 22 | — | 22 | — | 8 | 8 | 12 | 22 | 16 | — | — |
| | Kaolin B | — | — | — | — | — | — | — | — | — | — | — | — | — | — | 17 | 23 |
| | Kaolin C (calcinated) | — | — | — | — | — | — | — | — | — | — | — | — | 24 | 28 | 19 | 22 |
| | Alumina A | 19 | — | 26 | 19 | 19 | 19 | 26 | 19 | 26 | — | — | — | — | — | — | — |
| | Alumina B | — | 19 | — | — | — | — | — | — | — | — | 4 | — | 11 | 8 | — | — |
| | Alumina C | — | — | — | — | — | — | — | — | — | 7 | — | 6 | — | — | — | — |
| | Alumina D | — | — | — | — | — | — | — | — | — | — | — | — | — | — | 6 | 6 |
| | Aluminum hydroxide A | — | — | — | — | — | — | — | — | — | 7 | 10 | — | — | — | — | — |
| | Aluminum hydroxide B | — | — | — | — | — | — | — | — | — | — | — | — | — | 6 | — | — |
| | Aluminum hydroxide C | — | — | — | — | — | — | — | — | — | — | — | — | — | — | 15 | 10 |
| | Silica A | 15 | 15 | 27 | 15 | — | — | — | 7.5 | — | — | — | — | — | — | — | — |
| | Silica B | — | — | — | — | 15 | — | — | — | — | — | — | — | — | — | — | — |
| | Silica C | — | — | — | — | — | 15 | — | — | — | — | — | — | — | — | — | — |
| | Silica D | — | — | — | — | — | — | 27 | — | — | — | — | — | — | — | — | — |
| | Silica E | — | — | — | — | — | — | — | — | — | 5 | — | — | — | — | — | — |
| | Silica F | — | — | — | — | — | — | — | — | — | — | 2.5 | — | — | — | — | — |
| | Silica G | — | — | — | — | — | — | — | — | — | — | 2.5 | — | — | — | — | — |
| | Silica H | — | — | — | — | — | — | — | 7.5 | 26 | — | — | 10 | — | — | — | — |
| | Silica I | — | — | — | — | — | — | — | — | — | — | — | — | 1 | 1 | 4 | — |
| | Hydrotalcite | — | — | — | — | — | — | — | — | — | — | — | 3 | — | — | — | — |

TABLE 1-continued

| | Name of Component | Examples | | | | | | | | | Comparative Examples | | | | | | |
|---|---|---|---|---|---|---|---|---|---|---|---|---|---|---|---|---|---|
| | | 1 | 2 | 3 | 4 | 5 | 6 | 7 | 8 | 9 | 1 | 2 | 3 | 4 | 5 | 6 | 7 |
| Pore former | Coke | — | — | — | — | — | — | — | — | — | 3 | 2 | — | — | — | — | — |
| | forming resin | — | — | — | — | — | — | — | — | — | 65 | 57 | 36 | — | — | — | — |

TABLE 2

| Name of raw material component | Volume particle size (μm) | | | Volume particle size distribution ratio |
|---|---|---|---|---|
| | V10 | V50 | V90 | V90/V10 |
| Talc A | 4.4 | 11.8 | 25.0 | 5.7 |
| Talc B | 3.3 | 11.1 | 22.2 | 6.7 |
| Talc C | 5.6 | 11.1 | 20.2 | 3.6 |
| Talc D | 7.3 | 24.9 | 50.1 | 6.9 |
| Talc E | 2.3 | 10.0 | 31.8 | 13.8 |
| Talc F | 3.2 | 12.9 | 38.7 | 12.1 |
| Talc G | 2.7 | 9.8 | 27.1 | 10.0 |
| Talc H | 2.4 | 8.0 | 18.8 | 7.8 |
| Kaolin A | 3.4 | 11.0 | 28.1 | 8.3 |
| Kaolin B | 3.2 | 10.3 | 22.7 | 7.1 |
| Kaolin C (calcinated) | 0.9 | 2.8 | 9.1 | 10.1 |
| Alumina A | 7.2 | 13.2 | 22.2 | 3.1 |
| Alumina B | 1.9 | 6.1 | 15.1 | 7.9 |
| Alumina C | 0.5 | 2.6 | 8.1 | 16.2 |
| Alumina D | 1.7 | 4.6 | 8.3 | 4.9 |
| Alumina hydroxide A | 1.0 | 3.0 | 7.7 | 7.7 |
| Alumina hydroxide B | 0.5 | 1.0 | 1.8 | 3.6 |
| Alumina hydroxide C | 0.7 | 2.0 | 5.0 | 7.1 |
| Silica A | 2.3 | 15.2 | 32.0 | 13.9 |
| Silica B | 3.6 | 9.7 | 18.4 | 5.1 |
| Silica C | 3.3 | 11.1 | 22.2 | 6.7 |
| Silica D | 4.8 | 12.8 | 24.2 | 5.0 |
| Silica E | 18.5 | 39.9 | 103.0 | 5.6 |
| Silica F | 9.5 | 54.6 | 118.8 | 12.5 |
| Silica G | 3.6 | 27.3 | 72.2 | 20.1 |
| Silica H | 2.1 | 19.0 | 74.4 | 35.4 |
| Silica I | 1.0 | 3.7 | 11.0 | 11.0 |
| Hydrotalcite | 0.3 | 0.6 | 1.7 | 5.7 |
| Coke | 2.9 | 15.7 | 47.9 | 16.5 |
| Foaming resin | 20.3 | 40.5 | 77.0 | 3.8 |

The volume particle size distribution ratio ($V_{all}90/V_{all}10$) of the whole above-obtained cordierite-forming raw material is 8.3. In Table 3 are shown the volume particle size distribution ratio ($V_{all}90/V_{all}10$) of the whole cordierite-forming raw material and its 10 volume %, 50 volume %, and 90 volume % particle sizes ($V_{all}10$, $V_{all}50$, $V_{all}90$) [μm], and the volume particle size distribution range ($V_{all}90$-$V_{all}10$) [μm]

TABLE 3

| | Volume particle size (μm) | | | Volume particle size distribution ratio | Volume particle size distribution range (μm) |
|---|---|---|---|---|---|
| | $V_{all}10$ | $V_{all}50$ | $V_{all}90$ | $V_{all}90/V_{all}10$ | $V_{all}90$-$V_{all}10$ |
| Example 1 | 2.7 | 9.4 | 22.3 | 8.3 | 19.6 |
| Example 2 | 3.6 | 10.9 | 22.7 | 6.3 | 19.1 |
| Example 3 | 3.7 | 11.4 | 22.7 | 6.1 | 19.0 |
| Example 4 | 2.8 | 9.9 | 20.8 | 7.4 | 18.0 |
| Example 5 | 4.3 | 9.8 | 19.0 | 4.4 | 14.7 |
| Example 6 | 3.6 | 10.2 | 21.1 | 5.9 | 17.5 |
| Example 7 | 4.9 | 9.5 | 17.7 | 3.6 | 12.8 |
| Example 8 | 3.5 | 10.9 | 24.1 | 6.9 | 20.6 |
| Example 9 | 3.6 | 11.6 | 28.1 | 7.8 | 24.5 |
| Comparative Example 1 | 4.8 | 29.9 | 73.5 | 15.3 | 68.7 |
| Comparative Example 2 | 4.0 | 27.6 | 62.3 | 15.6 | 58.3 |
| Comparative Example 3 | 1.6 | 19.7 | 52.9 | 33.1 | 51.3 |
| Comparative Example 4 | 1.4 | 6.9 | 22.8 | 16.3 | 21.4 |
| Comparative Example 5 | 1.3 | 6.2 | 19.1 | 14.7 | 17.8 |
| Comparative Example 6 | 1.3 | 5.4 | 16.5 | 12.7 | 15.2 |
| Comparative Example 7 | 1.2 | 5.9 | 16.9 | 14.1 | 15.7 |

Next, 100 mass parts of the cordierite-forming raw material was placed in a kneader together with 30 to 40 mass parts of water and 6 mass parts of a binder, followed by kneading for 60 minutes to obtain clay.

Then, the clay was placed in a vacuum kneader, followed by kneading to produce a cylindrical clay. This clay was fed into an extrusion forming machine and formed into a honeycomb shape wherein a plurality of cells were separated and formed by partition walls, whereby was obtained a honeycomb formed body. This honeycomb formed body was subjected to dielectric drying and subsequent hot air drying, and then cut at the two ends to obtain a honeycomb dried body of predetermined dimensions.

Then, a part of the cell openings at each end of the honeycomb dried body were filled with plugging slurry made of a cordierite-forming raw material having the same composition as the above-mentioned cordierite-forming raw material, whereby plugging portions were formed at each end of the honeycomb dried body so that they looked checkerwise at each end.

The resulting honeycomb dried body was fired according to a firing schedule of keeping at the maximum temperature of 1,425° C. for 15 hours and firing for 100 hours to produce a cylindrical honeycomb filter. The whole shape of the honeycomb filter was that the shape of an end (face having cell openings) was a circle of 70 mm in diameter, the length was 100 mm, the thickness of each partition wall was 300 μm, and the cell density was 30 cells/cm². Incidentally, filters having a diameter of 300 mm and 150 mm besides 70 mm and a volume of 20L were produced and evaluated, and almost the same results as those of the present example were obtained.

The porosity (%) of the honeycomb structure obtained was calculated from the aforementioned formula (1) using the total pore volume (V) of the honeycomb structure measured by mercury porosimetry and the true specific gravity ($d_t$) of the material constituting the honeycomb structure (when the material is cordierite, $d_r$=2.52 g/cm³). The result is shown in Table 4.

TABLE 4

|  | Pore diameter distribution [μm] | | | Pore diameter distribution range [μm] | Porosity |
| --- | --- | --- | --- | --- | --- |
|  | D10 | D50 | D90 | D90-D10 | [%] |
| Example 1 | 5.7 | 9.7 | 15.5 | 9.8 | 48 |
| Example 2 | 6.8 | 14.8 | 24.5 | 17.7 | 51 |
| Example 3 | 7.5 | 17.3 | 25.2 | 17.7 | 62 |
| Example 4 | 6.0 | 11.5 | 16.4 | 10.4 | 49 |
| Example 5 | 7.0 | 9.2 | 12.5 | 5.5 | 68 |
| Example 6 | 10.3 | 14.9 | 21.6 | 11.3 | 65 |
| Example 7 | 10.3 | 14.4 | 20.1 | 9.8 | 69 |
| Example 8 | 5.9 | 11.1 | 20.5 | 14.6 | 44 |
| Example 9 | 5.5 | 12.5 | 23.2 | 17.7 | 42 |
| Comp. Ex. 1 | 13.9 | 24.6 | 46.7 | 32.8 | 65 |
| Comp. Ex. 2 | 7.0 | 16.8 | 31.0 | 24.0 | 60 |
| Comp. Ex. 3 | 5.2 | 12.4 | 27.2 | 22.0 | 51 |
| Comp. Ex. 4 | 1.8 | 5.1 | 16.4 | 14.6 | 34 |
| Comp. Ex. 5 | 1.9 | 4.9 | 14.1 | 12.2 | 32 |
| Comp. Ex. 6 | 1.6 | 3.0 | 11.4 | 9.8 | 33 |
| Comp. Ex. 7 | 1.5 | 2.7 | 13.9 | 12.4 | 27 |

Figure 2:
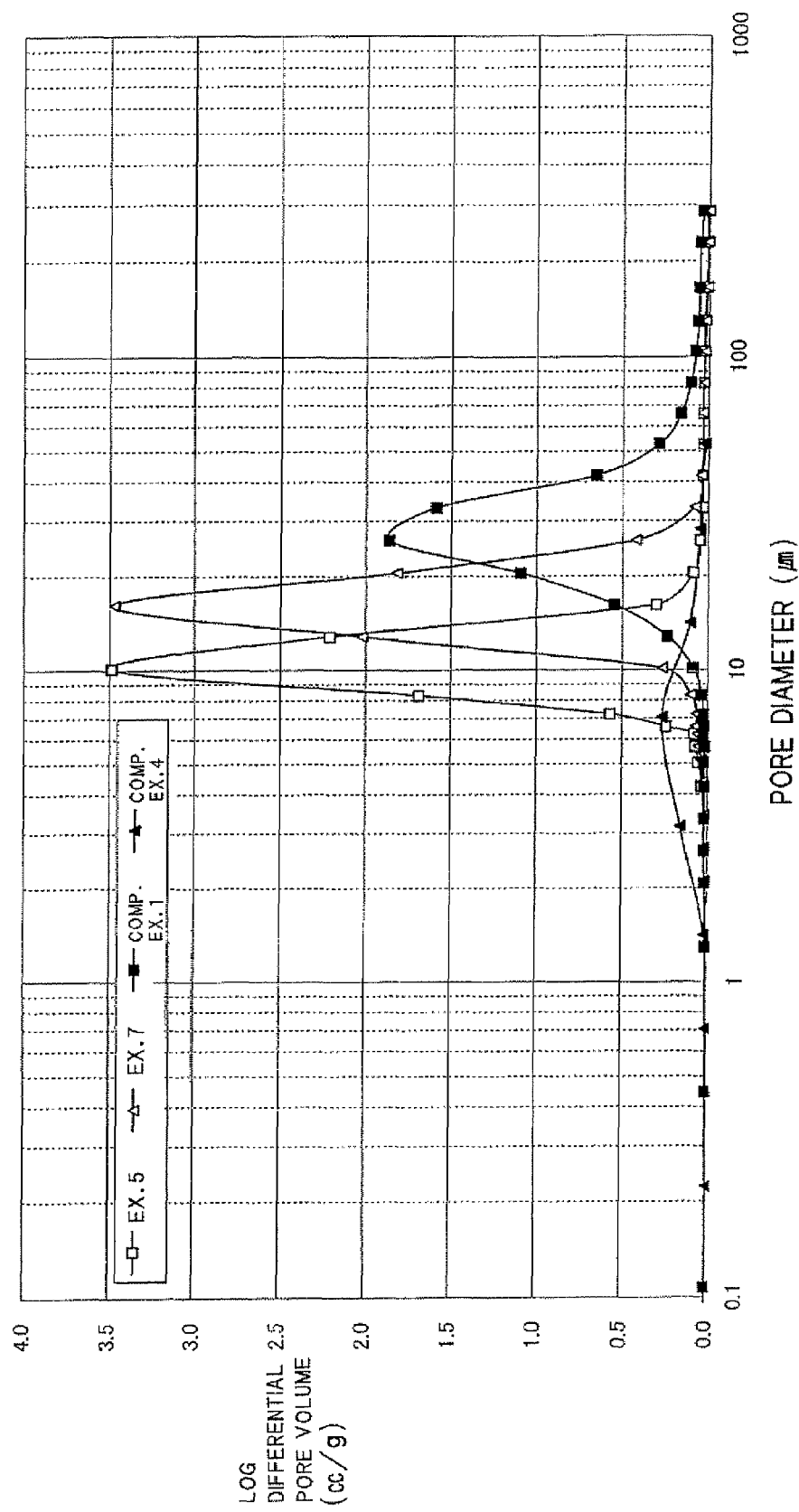
[FIG. 2]

Also, the pore diameter [μm] and pore volume [cc/g] of the honeycomb structure were measured by mercury porosimetry. FIG. 2 is a graph showing the relation (pore diameter distribution) between pore diameter [μm] and log differential pore volume [cc/g] of the honeycomb structure. The axis of abscissas indicates pore diameter [μm] and the axis of ordinates indicates log differential pore volume [cc/g]. Incidentally, in FIG. 2, square marks (outline marks) and triangular marks (outline marks) are the measured values of the honeycomb structures of Example 5 and Example 7/respectively.

Examples 2 to 9

Honeycomb structures were produced in the same manner as in Example 1 except that the compounding ratio of each of the components constituting the cordierite-forming raw material was changed as shown in Tables 1 and 2. Each honeycomb structure obtained was measured for porosity (%). The results of measurement are shown in Table 3.

Comparative Examples 1 to 7

Honeycomb structures were produced in the same manner as in Example 7 except that the compounding ratio of each of the components constituting the cordierite-forming raw material was changed as shown in Tables 1 and 2. Each honeycomb structure obtained was measured for porosity (%). The results of measurement are shown in Table 4.

Incidentally, in each of Comparative Examples 1 to 3, a pore former shown in Table 1 (coke and/or foaming resin) was further added to the cordierite-forming raw material, to prepare clay.

Each honeycomb structure obtained was measured also for pore diameter [μm] and pore volume [cc] in the same manners as in Example 7. FIG. 2 is a graph showing the relation (pore diameter distribution) between pore diameter [μm] and log differential pore volume [cc/g] of honeycomb structures. In FIG. 2, square marks (black) are the measured values of the honeycomb structure of Comparative Example 1, and triangular marks (black) are the measured values of the honeycomb structure of Comparative Example 4.

Discussion

Table 4 shows the results of a pore diameter distribution of Examples 1 to 9 and Comparative Examples 1 to 7. Here, D10 indicates a 10 volume % pore diameter [μm], D50 indicates a 50 volume % pore diameter [μm], and D90 indicates a 90 volume % pore diameter [μm]. An extent of sharpness of a pore diameter distribution was defined by a pore diameter distribution range (D90-D10). The smaller pore diameter distribution range indicates the sharper pore diameter distribution. The pore diameter distribution range (D90-D10) is desirably 20 μm or less. The honeycomb structures obtained in Examples 1 to 9 had each a high porosity (40% or more). When a honeycomb structure is used as a filter, it is desired that the pores are fine, that the distribution is sharp, and that the pore volume is large in order to make high the efficiency of particulate matter-trapping. As understood from the pore diameter distribution range of FIG. 4, the honeycomb structures obtained in Examples 1 to 9 were small in pore, sharp in pore diameter distribution ((D90-D10) of 20 μm or less) and large in pore volume, and had pore characteristics with which the honeycomb structures can suitably be used as a filter.

Meanwhile, the honeycomb structures obtained in Comparative Examples 1 to 3 had each a high porosity owing to the use of a pore former. However, as shown by the pore diameter distribution range in FIG. 4, they were broad in pore diameter distribution ((D90-D10) of above 20 μm), and, when used as a filter, were inferior in trapping of particulate matter. The honeycomb structures obtained in Comparative Examples 4 to 7 were extremely low in porosity. As understood from the pore diameter distribution range of FIG. 4, the honeycomb structures obtained in Comparative Examples 4 to 7 were very small in pore diameter and had a sharp pore diameter distribution. However, no pore former was used, the honeycomb structures had small pore volume (small distribution) and low porosity and were not suitable for use as a filter.

INDUSTRIAL APPLICABILITY

A honeycomb structure of the present invention is used preferably as a carrier of a catalyst for purification of exhaust gas from an internal combustion engine such as an automobile engine, a carrier of a deodorization catalyst, a filter of filter apparatus, a heat exchanger unit, or a carrier for chemical reactor such as a carrier of a reforming catalyst for fuel cell. Further, a process for producing a honeycomb structure according to the present invention can produce a honeycomb structure of the present invention easily.

The invention claimed is:

1. A method for producing a honeycomb structure produced via a step of forming clay obtained from a cordierite-forming raw material which contains an alumina source, a silica source, and a magnesia source into a honeycomb shape, wherein:
   each of the alumina source, the silica source, and the magnesia source has a 50 volume % particle size of 1 to 25 μm in its volume particle size distribution, and
   the cordierite-forming raw material has a ratio of 90 volume % particle size to 10 volume % particle size of 10 or less and a difference between 90 volume % particle size and 10 volume % particle size of 25 μm or less in its volume particle size distribution of the cordierite-forming raw material.

2. A process for producing a honeycomb structure according to claim 1, wherein each of the alumina source, the silica source and the magnesia source, includes a material having, in its volume particle size distribution, a 50 volume % particle size of 5 to 20 μm.

3. A process for producing a honeycomb structure according to claim 2, wherein each of the alumina source, the silica source and the magnesia source, includes a material having, in its volume particle size distribution, a 50 volume % particle size of 10 to 20 μm.

4. A process for producing a honeycomb structure according to claim 1, wherein the clay is prepared using no pore former and formed to produce a honeycomb structure.

5. A process for producing a honeycomb structure according to claim 4, which has a porosity of 40% or more.

* * * * *